(12) United States Patent
Dinwoodie

(10) Patent No.: US 7,387,822 B2
(45) Date of Patent: Jun. 17, 2008

(54) PROCESS OF MAKING A COMPOSITE MAT

(75) Inventor: John Dinwoodie, Wirral (GB)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 11/061,653

(22) Filed: Feb. 22, 2005

(65) Prior Publication Data

US 2005/0176322 A1    Aug. 11, 2005

Related U.S. Application Data

(60) Continuation of application No. 09/986,194, filed on Nov. 7, 2001, now abandoned, which is a division of application No. 09/230,366, filed as application No. PCT/GB97/01971 on Jul. 22, 1997, now abandoned.

(30) Foreign Application Priority Data

Jul. 26, 1996    (GB) ................... 9615720.1

(51) Int. Cl.
*B05D 5/00* (2006.01)
*B05D 3/02* (2006.01)
*B05D 3/06* (2006.01)
*B05D 3/12* (2006.01)

(52) U.S. Cl. ............... 427/402; 427/513; 427/543; 427/553; 427/369; 427/370

(58) Field of Classification Search .......... None
See application file for complete search history.

(56) References Cited

U.S. PATENT DOCUMENTS

| 3,012,923 | A | * | 12/1961 | Slayter | ............ 156/62.2 |
| 4,999,168 | A |   | 3/1991  | Ten Eyck |  |
| 5,002,836 | A |   | 3/1991  | Dinwoodie et al. |  |
| 5,502,937 | A |   | 4/1996  | Wilson |  |
| 5,853,675 | A | * | 12/1998 | Howorth | ............ 422/179 |
| 5,869,010 | A |   | 2/1999  | Langer |  |

FOREIGN PATENT DOCUMENTS

| EP | 0328293 A1 | 8/1989 |
| EP | 0573834 A1 | 12/1993 |
| WO | 9323245 A1 | 11/1993 |
| WO | 9424425 A1 | 10/1994 |
| WO | 9702413 A1 | 1/1997 |
| WO | 9732118 A1 | 9/1997 |

OTHER PUBLICATIONS

Merriam Webster's Collegiate Dictionary, 10$^{th}$ Edition, 1997, p. 332.

* cited by examiner

*Primary Examiner*—William P Fletcher, III
(74) *Attorney, Agent, or Firm*—Nixon & Vanderhye P.C.

(57) ABSTRACT

A method for the production of a laminated composite mat is disclosed. The method involves impregnating a fibre mass with a liquid binder system and subjecting the so-obtained impregnated fibre mass to a drying step while the impregnated fibre mass is deposited as a layer on one side of a performed sheet incorporating an intumescent material so as to, at least, substantially remove the carrier liquid.

9 Claims, No Drawings

PROCESS OF MAKING A COMPOSITE MAT

This application is a continuation of Ser. No. 09/986,194, filed Nov. 7, 2001 now abandoned which is a divisional of application Ser. No. 09/230,366, filed Jan. 26, 1999 now abandoned, which in turn is a 37 of PCT/GB97/01971 filed Jul. 22, 1997, the entire content of which is hereby incorporated by reference in this application.

The present invention relates to a laminated composite mat comprising a layer of inorganic fibres which are bound together with a binder and a layer of an intumescent material. More particularly, the present invention relates to a laminated composite mat which can be used for resiliently mounting the fragile ceramic or metal monoliths which are found in catalytic converters and diesel particulate filters in their metal casings. The invention also relates to a process for preparing a laminated composite mat.

Catalytic converters and diesel particulate filters are routinely fitted to automobiles and other road going vehicles in order to purify the exhaust gases which are generated by the engine. These devices usually comprise a ceramic honeycomb monolith which is housed within a metal casing and provides a support for the catalyst. The ceramic monolith comprises a plurality of tiny flow channels and is a fragile structure which is susceptible to damage when subjected to the kind of vibrational forces which prevail when any road going vehicle is in use. Moreover, the monolith and the surrounding metal casing are subjected to extremely high temperatures in use which causes them to expand, but not to the same extent. In consequence, the mounting system which is used to mount the ceramic monolith in its metal casing must insulate the monolith from the attendant vibrational forces and compensate for any difference between the expansion of the monolith and the casing. In this way, the stresses to which the monolith is subjected during use as a result of differential expansion or vibrational forces can be reduced to an acceptable level.

It is known to use a composite fibre mat to mount the fragile ceramic monolith in the surrounding metal casing, see for example U.S. Pat. No. 4,011,651 and WO-94/24425. The fibre mat is arranged in the annular space between the monolith and the surrounding metal casing and is maintained under compression in the annular space so exerting a radial pressure on the monolith and the casing which retains the monolith in place.

We have now developed a laminated composite mat comprising a layer of inorganic fibres which are bound together with a binder and a layer of an intumescent material. The composite mat can be used to mount the ceramic or metal monoliths found in catalytic converters and diesel particulate filters in their metal casings.

According to a first aspect of the present invention there is provided a laminated composite mat comprising first and second layers, the first layer comprising an intumescent (expandable) material and the second layer comprising a plurality of inorganic fibres and a binder which serves to bind the fibres together and to bond the second layer to the first layer.

The laminated composite mat of the first aspect of the present invention comprises two discrete layers which are bonded together to form an integral assembly by the adhesive action of the binder contained in the second layer.

According to a second aspect of the present invention there is provided a laminated composite mat comprising first and second layers, the first layer comprising an intumescent (expandable) material and the second layer comprising a plurality of inorganic fibres and a binder which is substantially uniformly distributed throughout the second layer and which binds the fibres together, said second layer having a laminar shear strength of at least 0.1 MPa.

The laminated composite mat of the second aspect of the present invention also comprises two discrete layers which are held together. e.g. by stitching or needle-punching, to form an integral assembly. The binder contained in the second layer is substantially uniformly distributed throughout that layer and binds the fibres together so that the layer has a laminar shear strength of at least 0.1 MPa. Preferably, in this second aspect the two discrete layers of the laminated composite mat are held together by the adhesive action of the binder contained in the second layer.

The intumescent material contained in the first layer is preferably an unexpanded layer silicate mineral and more preferably is unexpanded vermiculite. The unexpanded vermiculite is preferably in the form of flakes and may be untreated or treated by being ion exchanged with ammonium compounds such as ammonium dihydrogen phosphate, ammonium carbonate or ammonium chloride. In a preferred embodiment, the first layer is itself a flexible composite sheet comprising a combination of unexpanded vermiculite flakes, an organic binder, an inorganic filler and optionally a fibrous inorganic material. Suitable fibrous inorganic materials include aluminosilicate fibres, glass fibres, zirconia fibres, zirconia-silica fibres, alumina fibres, alumina whiskers, aluminoborosilicate fibres, mullite fibres and titania fibres. Suitable organic binders include natural rubber, styrene-butadiene copolymers, butadiene-acrylonitrile copolymers and acrylate and methacrylate polymers and copolymers. Suitable inorganic fillers include expanded vermiculite, hollow glass microspheres and bentonite. In this preferred embodiment, the first layer will preferably comprise from 20.0 to 65.0% by weight of the unexpanded vermiculite flakes, from 3.0 to 20.0% by weight of the organic binder, up to 40.0% by weight of the inorganic filler and from 10.0 to 50.0% by weight of the fibrous inorganic material (if present). Such flexible composite sheets are available in a thickness of from about 1.5 to about 10.0 mm under the trade name Interam.

The inorganic fibres contained in the second layer of the composite mat of the invention may be any of the inorganic fibres known in the art. However, when the composite mat is to be used in catalytic converters and diesel particulate filters for resiliently mounting the ceramic or metal monoliths they contain, the fibres will need to be thermally stable (i.e. will not degrade) at the high operating temperatures prevailing in such devices. Typically, the fibres contained in composite mats which are to be used in such mounting applications will be thermally stable at temperatures in excess of 700° C., preferably in excess of 800° C. and more preferably in excess of 900° C.

Thermally stable inorganic fibres include ceramic fibres such as alumina, mullite, aluminosilicate, aluminoborosilicate, zirconia and titania fibres as well as vitreous glass fibres. The preferred thermally stable inorganic fibres are polycrystalline inorganic fibres, particularly polycrystalline inorganic oxide fibres, such as alumina, mullite, aluminosilicate, aluminoborosilicate, zirconia and titania fibres. Of these, alumina fibres, by which term we are also intending to include alumina fibres comprising a few weight % of silica added as a phase stabilizer, are particularly preferred. The fibres are preferably short staple fibres having a length in the range of from 1 to 10 cms and a mean diameter in the range of from 1 to 10 microns. Especially preferred alumina fibres are those sold in the form of a loosely bound, low density mat by Imperial Chemical Industries PLC under the trade name Saffil which are thermally stable at temperatures in excess of 1000° C.

The second layer may comprise two or more different types of inorganic fibre which may be intimately mixed or else segregated and arranged in definite patterns, e.g. in discrete layers.

The binder contained in the second layer may be an inorganic material, but is preferably organic and more preferably is an organic polymer. Suitable organic binders are more particularly described in U.S. Pat. No. 4,011,651 and WO-94/24425, the disclosures in which are incorporated herein by way of reference, and include polymers derived from precursor polymers or prepolymers which are cured in situ on the inorganic fibres as part of the process used to manufacture the composite mat.

A particularly suitable binder is that obtained on curing a curable polymer composition. Suitable examples of curable polymer compositions are those comprising a combination of an acrylic polymer and a cross-linking agent, particular an epoxy group containing cross-linking agent such as an epoxy resin. Curable polymer compositions of this type will typically comprise from 90.0 to 99.0% by weight, preferably from 95.0 to 99.0% by weight of the acrylic polymer and from 1.0 to 10.0% by weight, preferably from 1.0 to 5.0% by weight of the cross-linking agent. The acrylic polymer is suitably a homopolymer or copolymer comprising monomer units derived from at least one acrylic monomer selected from the $C_{1-8}$alkyl ($C_{1-4}$alklyl)acrylates, and in a preferred embodiment is a homopolymer or copolymer comprising monomer units derived from at least one acrylic monomer selected from the $C_{1-4}$alkyl (meth)acrylates, for example methyl methacrylate, methyl acrylate, ethyl acrylate, propyl acrylate and butyl acrylate. One suitable example of such a binder is a copolymer based on n-butyl acrylate and acrylonitrile.

When a composite mat of the invention is to be used for mounting a ceramic or metal monolith in a catalytic converter or in a diesel particulate filter, the binder contained in the second layer is preferably an organic binder which will be substantially pyrolysed/burned out by the high temperatures to which the mat will be subjected in use. In addition, the organic binder is preferably one which will not lead to the generation of toxic emissions when it is pyrolysed/burned out and for this reason is preferably free of chlorine and nitrogen.

The loading of the binder in the second layer will typically be in the range of from 2 to 15% by weight and preferably in the range of from 5 to 15% by weight.

When a composite mat of the invention is to be used to mount a ceramic or metal monolith, the inorganic fibres contained in the second layer will generally be held in a compressed state by the binder so that they can exert a pressure which acts between the monolith and the surrounding casing once the binder is removed. Typically, the second layer will have a density in the range of from 30 to 700 kg/m$^3$, preferably in the range of from 100 to 500 kg/m$^3$ and more preferably in the range of from 100 to 350 kg/m$^3$.

The binder contained in the second layer of the composite mat of the second aspect of the present invention is substantially uniformly distributed throughout that layer. Preferably the distribution of the binder in the second layer is such that the percentage by weight of binder in each 1 mm$^3$ region of the layer based on the total weight of the layer in that region is within 40%. more preferably within 30% and particularly preferably within 20% of the overall percentage by weight of binder in the layer based on the total weight of the layer. In an especially preferred embodiment, the distribution of the binder in the second layer is such that the percentage by weight of binder in each 1 mm$^3$ region of the layer based on the total weight of the layer in that region is within 10% of the overall percentage by weight of binder in the layer based on the total weight of the layer.

In the composite mat of the second aspect of the present invention, the second layer has a laminar shear strength, by which is meant the force which has to be applied in order to bring about delamination of the layer, of at least 0.1 MPa, preferably of at least 0.2 MPa and more preferably of at least 0.3 MPa. The laminar shear strength can be conveniently measured on an Instron or similar machine using a three point bend test. Preferably, the second layer is also capable of exerting a pressure of at least 1.0 kgf/cm$^2$, more preferably in the range of from 1.5 to 4.0 kgf/cm$^2$ when a sample of the layer having a thickness in the range of from 5 to 10 mm is compressed to a thickness of 3 mm between two plates and the binder removed.

The second layer is conveniently formed by impregnating a fibre mass comprising the inorganic fibres with a liquid binder system comprising the binder or a precursor thereof and a carrier liquid. After the fibre mass has been impregnated with the liquid binder system, and generally following removal of any excess carrier liquid, the impregnated fibre mass is subjected to a drying step. The impregnated fibre mass is preferably held under compression during at least a part of the drying step until such time as the binder is able to hold the fibres together and significantly limit the expansion of the fibrous layer once the compressive forces are released. In general, the whole of the drying step will be performed while the impregnated fibre mass is held under compression, but it may also be possible to perform just the final stages of the drying step in this manner and still obtain satisfactory results. During the drying step, substantially all and preferably all of any residual carrier liquid will be removed. Removal of excess carrier liquid prior to drying can be achieved by pressing the impregnated fibre mass between rollers or plates, by placing it under vacuum or by centrifuging.

The pressure which is usually applied during the drying step to compress the impregnated fibre mass will generally be in the range of from 5 to 500 KPa, preferably in the range of from 5 to 200 KPa. In general, the pressure applied is such as to produce a bound fibrous layer having a density in the range of from 30 to 700 kg/m$^3$, preferably in the range of from 100 to 500 kg/m$^3$, more preferably in the range of from 100 to 350 kg/m$^3$. When the fibre mass which is impregnated is a multi-fibre product having a thickness in the range of from 10 to 60 mm. e.g. in the range of from 30 to 50 mm, and an area density in the range of from 0.2 to 2.0 kg/m$^2$, e.g. in the range of from 1.0 to 2.0 kg/m$^2$, the resulting impregnated fibre mass will generally be compressed to a thickness in the range of from 2 to 5 mm during the drying step. This pressure is conveniently applied in a batch process by sandwiching the impregnated fibre mass or a laminate of the impregnated fibre mass and a performed intumescent sheet between plates and then squeezing the plates together, e.g. by means of clamps, spring loaded clips or hydraulic presses. Alternatively, in a continuous process, it may be convenient to generate the necessary compressive forces on the impregnated fibre mass using an arrangement of rollers or belts.

The fibre mass which is impregnated may comprise a plurality of discrete fibres or it may take the form of a multi-fibre product in which the individual fibres are assembled into a low density mat which is loosely held together by fibre intertwining or perhaps more robustly consolidated by some other means such as weaving, knitting, stitching, needle-punching or vacuum packing. Preferably, the fibre mass which is impregnated is a multi-fibre product, particularly one having a thickness in the range of from 10 to 60 mm, more particularly in the range of from 30 to 50 mm, and an area density in the range of from 0.2 to 2.0 kg/m$^2$, more particularly in the range of from 1.0 to 2.0 kg/m$^2$.

The liquid binder system may comprise an inorganic binder material, but preferably comprises an organic binder or a precursor thereof and an organic or aqueous carrier liquid which is able to dissolve or disperse the organic binder or precursor. Suitable binder systems are described in U.S. Pat. No. 4,011,651 and WO-94/24425 and include dispersions or solutions of polymers or of curable precursor polymers (prepolymers) which can be cured in situ on the impregnated fibre mass as part of the drying step or in a subsequent processing step. The organic binder or its precursor may be a recyclable material which allows for the recovery of fibres from waste product generated in the manufacture of the laminated composite mat of the invention.

A particularly suitable binder system is one comprising a dispersion, preferably an aqueous dispersion, of a curable polymer composition, sometimes termed a resin or latex. Suitable examples of curable polymer compositions are those comprising a combination of an acrylic polymer and a cross-linking agent, particular an epoxy group containing cross-linking agent such as an epoxy resin. Curable polymer compositions of this type will typically comprise from 90.0 to 99.0% by weight, preferably from 95.0 to 99.0% by weight of the acrylic polymer and from 1.0 to 10.0% by weight, preferably from 1.0 to 5.0% by weight of the cross-linking agent. The acrylic polymer is suitably a homopolymer or copolymer comprising monomer units derived from at least one acrylic monomer selected from the $C_{1-8}$ alkyl ($C_{1-4}$ alkyl)acrylates, and in a preferred embodiment is a homopolymer or copolymer comprising monomer units derived from at least one acrylic monomer selected from the $C_{1-4}$ alkyl (meth)acrylates, for example methyl methacrylate, methyl acrylate, ethyl acrylate, propyl acrylate and butyl acrylate. A preferred binder system is one comprising an aqueous dispersion of a curable copolymer based on n-butyl acrylate and acrylonitrile.

When the liquid binder system is one comprising a curable polymer composition, it may also comprise a catalyst to accelerate the curing process.

It will be appreciated from the above, that by the term liquid binder system we are also intending to include binder systems which comprise dispersions or suspensions of finely divided solids in liquid vehicles.

The liquid binder system will typically comprise from 0.5 to 50.0% by weight of the binder or precursor and from 50.0 to 99.5% by weight of the carrier liquid. Preferably the liquid binder system will comprise from 0.5 to 10.0% by weight, more preferably from 1.0 to 5.0% by weight of the binder or precursor and from 90.0 to 99.5% by weight, more preferably from 95.0 to 99.0% by weight of the carrier liquid.

The drying step normally involves the application of heat. A conventional oven may be employed to provide the heating, but in one method which is used to prepare a laminated composite mat of the invention dielectric heating such as microwave or radio frequency heating, preferably in combination with a conventional heating means such as a flow of hot air, is employed since it can result in an appreciably more uniform distribution of the binder in the second fibrous layer. Typically, the drying step will involve heating the impregnated fibre mass to a temperature in the range of from 80 to 200° C., preferably in the range of from 100 to 170° C. Temperatures in the range of from 140 to 160° C. are especially preferred.

Accordingly, in a third aspect of the present invention there is provided a method for the production of a laminated composite mat comprising first and second layers, the first layer comprising an intumescent material and the second layer comprising a plurality of inorganic fibres and a binder which binds the inorganic fibres together, which method comprises forming the second layer by a process comprising impregnating a fibre mass comprising the inorganic fibres with a liquid binder system comprising the binder or a precursor thereof and a carrier liquid and subjecting the impregnated fibre mass which is obtained to a drying step comprising the use of dielectric heating so as to at least substantially remove the carrier liquid.

In another method which is used to prepare a laminated composite mat of the invention, at least the final stages of the process used to remove the carrier liquid are conducted while the impregnated fibre mass is positioned on one side of a performed sheet of the intumescent material so as to allow the binder to perform the function of bonding the first and second layers together.

Accordingly, in a fourth aspect of the present invention there is provided a method for the production of a laminated composite mat comprising first and second layers, the first layer comprising an intumescent material and the second layer comprising a plurality of inorganic fibres and a binder which serves to bind the inorganic fibres together and to bond the second layer to the first layer, which method comprises impregnating a fibre mass comprising the inorganic fibres with a liquid binder system comprising the binder or a precursor thereof and a carrier liquid and subjecting the impregnated fibre mass which is obtained to a drying step while deposited as a layer on one side of a performed sheet comprising the intumescent material so as to at least substantially remove the carrier liquid.

In the method of this fourth aspect, the drying step normally involves the application of heat. A conventional oven may be employed to provide the heating, but in a preferred embodiment dielectric heating such as microwave or radio frequency heating, preferably in combination with a conventional heating means such as a flow of hot air, is employed. The typical and preferred temperatures employed in the drying step are as described above.

In the method of this fourth aspect, a layer of inorganic fibres can be deposited on one side of the performed intumescent sheet and then impregnated with the liquid binder system while in position on that sheet. Removal of the carrier liquid from the impregnated fibre layer and curing of the precursor binder when such a material is used will produce a laminated composite mat of the invention in which the layer of inorganic fibres is bound together and also bonded to the performed intumescent sheet by the action of the binder which is left behind. Alternatively, the fibre mass may first be impregnated with the liquid binder system and then deposited on one side of the performed intumescent sheet to form a layer. As before, removal of the carrier liquid from the impregnated fibre mass and curing of the precursor binder when used will produce a laminated composite mat of the invention, but with this latter technique a proportion of the carrier liquid can be removed from the impregnated fibre mass before it is deposited on the performed intumescent sheet.

It may also be advantageous to coat the performed intumescent sheet with the liquid binder system prior to depositing the fibre mass or impregnated fibre mass thereon, e.g. by spraying the sheet with the liquid binder system or by immersing the sheet in a bath of the liquid binder system.

In this fourth aspect of the present invention, any removal of excess carrier liquid prior to drying can be achieved either before or when the impregnated fibre mass is in position on the preformed intumescent sheet. It may also be desirable to subject the impregnated fibre mass to a pre-drying step, in which a substantial proportion of the carrier liquid is removed by the application of heat, before it is laid in position on the preformed intumescent sheet. The drying step itself is carried out while the impregnated fibre mass is in position on the preformed intumescent sheet.

Various techniques may be used to impregnate the mass of inorganic fibres. For example, the individual fibres may be thoroughly dispersed in the liquid binder system and the resulting dispersion cast into a layer, e.g. using a paper making process. In the method of the fourth aspect of the present invention, the dispersion can be cast as a layer on a preformed intumescent sheet. Alternatively, individual fibres may be deposited as a layer, e.g. on a preformed intumescent sheet, and the resulting fibre layer impregnated with the liquid binder system.

When the mass of inorganic fibres takes the form of a multi-fibre product in which the individual fibres are assembled into a low density mat, the mat may be simply immersed or soaked in the liquid binder system. Alternatively, the low density fibre mat may be sprayed with the liquid binder system. In the method of the fourth aspect of the present invention, treatment of the mat with the liquid binder system may be carried out either before or after the mat is laid in position on the preformed intumescent sheet.

When the liquid binder system comprises a dispersion of a curable precursor polymer, as is preferred, the drying step may be followed by a further processing step in which the precursor polymer is cured. This curing process preferably involves the precursor polymer undergoing some form of cross-linking reaction. However, the temperatures which are employed in the drying step are usually sufficient to both dry the impregnated fibre mass and cure the precursor polymer so that a separate curing step is generally unnecessary. When a separate curing step is employed, however, it is desirable to maintain the impregnated fibre mass under compression for the duration of the curing step.

The thickness of the composite mat of the invention will depend on the intended end use for the mat. However, when the composite mat is to be used to mount a ceramic or metal monolith in a catalytic converter or diesel particulate filter, it will typically have a thickness in the range of from 3 to 15 mm, preferably in the range of from 5 to 12 mm and more preferably in the range of from 5 to 9 mm.

The thickness of the first and second layers relative to one another may be different for different applications and may be adjusted so that the composite mat gives the best performance in a given application in line with acceptable cost. However, the first layer containing the intumescent material will typically constitute from 10 to 50% of the total thickness of the composite mat.

The laminated composite mat of the invention may also be used to support the ceramic monoliths found in hot gas filtration units and coal gasification plants. The laminated composite mat of the invention may also be usefully employed in gasket applications.

The present invention is now illustrated but not limited with reference to the following example.

EXAMPLE 1

A sample of Saffil (TM) low density alumina fibre mat having an area of about 520 mm by 210 mm and a thickness of from 25 to 55 mm was immersed in a latex (Acronal (TM) 35D, a 50% aqueous dispersion of a curable copolymer based on n-butyl acrylate and acrylonitrile available from BASF) which had been diluted to a solids content of around 3% w/w. The impregnated Saffil mat weighed approximately 131.0 g and had an area density of about 1.2 kg/m$^2$.

The impregnated Saffil mat was then laid on top of a similar sized piece of Interam (TM) 100 mounting mat (an intumescent sheet material available from 3M: area density about 1.05 kg/m$^2$) which had been previously immersed in the same latex solution as the Saffil mat. The resulting laminate was sandwiched between two sheets of PTFE-coated glass fibre mesh which provided a release surface and this sandwich was then placed between two sheets of glass fibre filled silicone resin board. The whole assembly was then pressed together using mole grips until the impregnated "Saffil" layer was reduced to a thickness of about 5 mm (equal to an applied pressure of about 0.5 bar (50 KPa)), and held in this position with clips. During this assembly excess latex drained from the samples.

The complete mould assembly was then placed on the belt of an air/radio frequency (RF) assisted oven and the belt speed was adjusted to give a residence time of about 20 minutes. The RF power to the oven was set at about 5.5 KW and the temperature of the air in the oven was adjusted to about 155° C. The sample was removed from the oven when the latex had been fully dried and cured (cross-linked). The clips and the boards were then carefully removed from the samples and the PTFE mesh peeled off to reveal the final composite mat which had a thickness of around 8 to 9 mm.

The invention claimed is:

1. A method for the production of a laminated composite mat comprising first and second layers, the first layer comprising an intumescent material and the second layer comprising a plurality of inorganic fibres and a binder which serves to bind the inorganic fibres together and to bond the second layer to the first layer, which method comprises impregnating a fibre mass comprising the inorganic fibres with a liquid binder system comprising the binder or a precursor thereof and a carrier liquid and subjecting the impregnated fibre mass which is obtained to a drying step while deposited as a layer on one side of a preformed sheet comprising the intumescent material so as to at least substantially remove the carrier liquid.

2. A method as claimed in claim 1, wherein dielectric heating is employed in the drying step.

3. A method as claimed in claim 1, wherein a combination of dielectric heating and a flow of hot air is employed in the drying step.

4. A method as claimed in claim 1, wherein microwave or radio frequency heating is employed.

5. A method as claimed in claim 1, wherein the impregnated fibre mass is held under compression during at least a part of the drying step.

6. A method as claimed in claim 5, wherein the whole of the drying step is performed while the impregnated fibre mass is held under compression.

7. A method as claimed in claim 5, wherein the pressure which is applied during the drying step to compress the impregnated fibre mass is in the range of from 5 to 500 KPa.

8. A method as claimed in claim 1, wherein the fibre mass which is impregnated is a multi-fibre product in which the individual fibres are assembled into a low density mat.

9. A method as claimed in claim 8, wherein the multi-fibre product has a thickness in the range of from 10 to 60 mm and an area density in the range of from 0.2 to 2.0 kg/m$^2$.

* * * * *